United States Patent
Ito et al.

(10) Patent No.: US 6,596,372 B2
(45) Date of Patent: Jul. 22, 2003

(54) CERAMIC HONEYCOMB STRUCTURAL BODY AND METHODS OF PREPARING THE SAME

(75) Inventors: Keiji Ito, Nagoya (JP); Masanori Yamada, Nishio (JP); Tomohiko Nakanishi, Nishio (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 109 days.

(21) Appl. No.: 09/729,847

(22) Filed: Dec. 6, 2000

(65) Prior Publication Data

US 2001/0003728 A1 Jun. 14, 2001

(30) Foreign Application Priority Data

Dec. 7, 1999 (JP) ............................. 11-347678

(51) Int. Cl.⁷ ................................. B32B 3/12
(52) U.S. Cl. ....................... 428/116; 428/34.4; 502/493; 264/631
(58) Field of Search ................ 428/116, 34.4; 502/493; 264/631

(56) References Cited

U.S. PATENT DOCUMENTS 4,455,336 A 6/1984 Ogawa et al.
6,242,072 B1 * 6/2001 Ueda et al. ............... 428/116

FOREIGN PATENT DOCUMENTS

| DE | 199 02 540 A1 | 7/1999 |
| DE | 199 25 391 A1 | 12/1999 |
| EP | 0 354 053 | 7/1989 |
| GB | 2 071 639 A | 9/1981 |
| JP | 62-6855 | 2/1981 |
| JP | 63-73335 | 5/1988 |

* cited by examiner

Primary Examiner—Deborah Jones
Assistant Examiner—Ling Xu
(74) Attorney, Agent, or Firm—Nixon & Vanderhye PC

(57) ABSTRACT

A ceramic honeycomb structural body, and method for preparing the same, which can satisfactorily support a catalyst and can demonstrate superior mechanical strength, even if far thinner walls are used. The structural body comprises lattice walls formed by a large number of cells which are channels for a fluid and a peripheral wall which covers at least the circumference of the lattice walls. The outer peripheral portion of the lattice walls located in the vicinity of the peripheral wall (area B) contains a densified portion of smaller porosity than that of an inner peripheral portion, of the lattice walls, which is located inside the outer peripheral portion (area A).

9 Claims, 1 Drawing Sheet

CERAMIC HONEYCOMB STRUCTURAL BODY AND METHODS OF PREPARING THE SAME

BACKGROUND OF THE INVENTION

1. Fields of the Invention

This invention relates to a ceramic honeycomb structural body to be used for, e.g., a catalyst support for purifying exhaust gases of an internal combustion engine, or a filter for purifying water, etc., and to methods of preparing the same.

2. Description of Related Art

In recent years, with the appearance of stricter emission regulations regarding automobile engines, it has been required to activate a catalyst for purifying exhaust gases early in order to reduce hydrocarbon emission just after starting the engines. To lower the thermal capacity of the ceramic honeycomb structural body having catalyst components is one of means used to provide such early activation of the catalyst. It is required to reduce the thickness of cell walls of said ceramic honeycomb structural body when such means are used. However, the mechanical strength of said structural body decreases with a decrease in the thickness of the cell walls of said structural body.

With respect to means for improvement of the mechanical strength of the honeycomb structural body, it has been proposed, as described in Japanese Publication No. 62-6855, to fill pores in walls, in the neighborhood of an outer peripheral wall among the outer peripheral wall and lattice walls consisting of channel cells, with reinforcing materials of a lower porosity.

However, the honeycomb structural body reinforced by the above-mentioned method has a problem with lower durability. Specifically, when a ceramic honeycomb structural body is located, as a catalyst support for a catalyst for purifying exhaust gases, in the exhaust pipe of engine, said body is exposed repeatedly to thermal changes from a low temperature to a high temperature. Therefore, when it is used, it sometimes suffers delamination between the lattice walls and the reinforcing materials, or a thermal shock fracture due to the thermal history. Furthermore, said delamination and fracture may arise during the cooling process after the firing process for manufacturing said body. It is supposed that such in conveniences result from the difference, in thermal expansion coefficients, between said lattice walls and said reinforcing materials, and the discontinuity between reinforced and non-reinforced areas.

In addition, as mentioned above, when pores are filled with reinforcing materials, the disappearance of pores open to the surface leads to a decrease in the surface area of said body. Therefore, the amount of a supported catalyst or the amount of a supported carrier having large surface area, which is a medium for applying a catalyst to said body, decreases, and then it is difficult to satisfactorily achieve catalytic performance. Further, when pores are filled with reinforcing materials, alkali metals or alkaline earth metals, such as K, Na, Ca etc., are added as a flux component so as to improve the bondability with a matrix. However, these materials cause an increase in the thermal expansion coefficient, and then when thermal changes are repeated, the use of the reinforcing materials is apt to result in heat shock fracture or delamination.

SUMMARY OF THE INVENTION

In light of the foregoing circumstances, it is an object of the present invention to provide a ceramic honeycomb structural body, and methods of preparing the same, which can satisfactorily support a catalyst and can demonstrate superior mechanical strength, even if far thinner walls are used.

The above object is achieved according to a first embodiment of the present invention by providing a ceramic honeycomb structural body, comprising: lattice walls formed by a large number of cells which are channels for a fluid; and a peripheral wall which covers the circumference of said lattice walls, an outer peripheral portion of said lattice walls at least located in the vicinity of said peripheral wall containing a denser portion of a lower porosity than that of an inner peripheral portion of said lattice walls which are located inside said outer peripheral portion.

Other and further object, features and advantages of the present invention will appear more fully from the following description.

BRIEF DESCRIPTION OF THE DRAWINGS

The invention will be more particularly described with reference to the accompanying drawings, in which.

DETAILED DESCRIPTION OF THE INVENTION

Figure 1:
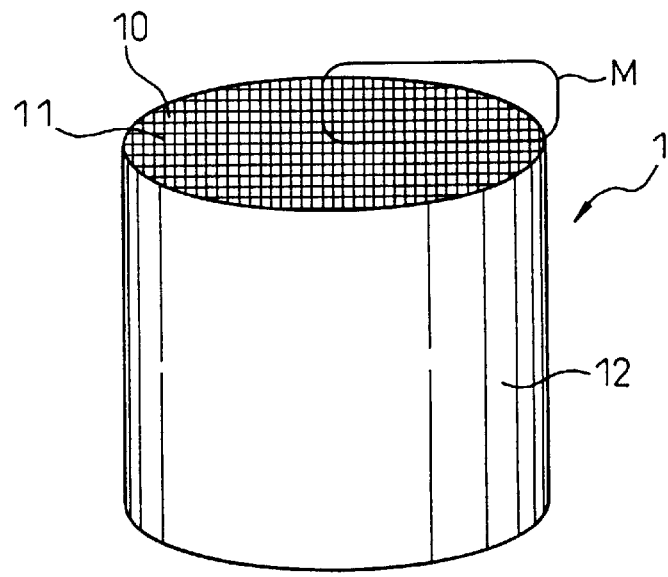
FIG. 1 is a perspective view of an embodiment of the invention.

The invention provides a ceramic honeycomb structural body, comprising: lattice walls formed by a large number of cells which are channels for fluid; and a peripheral wall which covers the circumference of said lattice walls, an outer peripheral portion of said lattice walls, at least located in the vicinity of said peripheral wall, containing a denser portion of a lower porosity than that of an inner peripheral portion of said lattice walls which is located inside said outer peripheral portion.

It should be noted that, in the invention, the outer peripheral portion itself of said lattice walls is made denser without using conventional reinforcing materials, at least said outer peripheral portion of said lattice walls having a smaller porosity than said inner peripheral portion. Therefore, said outer peripheral portion becomes a reinforced portion which has a higher mechanical strength than said inner peripheral portion of a larger porosity. Thus, when said lattice walls and said peripheral wall are made thinner to lower the thermal capacity of a ceramic honeycomb structural body, the mechanical strength required of said entire body is maintained due to the presence of said reinforced portion at least in said outer peripheral portion. On the other hand, said inner peripheral portion can have a high porosity as usual.

Further, as mentioned above, the mechanical strength of said outer peripheral portion is improved by lowering the porosity itself, and reinforcing materials do not fill the pores. Thus, pores open to the surface of said outer peripheral portion can be maintained, and an uneven surface and a large surface area can be secured. Thereby, when said ceramic honeycomb structural body is used as a catalyst support, the amount of the supported catalyst or carrier can be sufficiently secured. Consequently, according to the invention, the ceramic honeycomb structural body can satisfactorily support a catalyst and can demonstrate superior mechanical strength, even if far thinner walls are used.

In a preferred embodiment of the invention, it is preferable that ΔPr demonstrated by the following equation is not less than 5%:

$\Delta Pr = -(Pout - Pin)/Pin$ in which Pout is the porosity of said denser portion in the outer peripheral portion of said lattice walls, and Pin is the porosity of the inner peripheral portion of said lattice walls. When said ΔPr is less than 5%, there is a problem that said densified portion cannot have a sufficient mechanical strength.

Furthermore, preferably, the thickness of the outer peripheral portion of said lattice walls is not less than 1.2% of a distance between the center of said body and the inner side of said peripheral wall. When said thickness is less than 1.2%, there is a problem that said structural body cannot have sufficient mechanical strength. Moreover, it is preferable that the porosity of said denser portion in the outer peripheral portion of said lattice walls is gradually reduced from the inside to the outside. This constitution can restrain rapid changes of the mechanical strength in the boundary area between the inner and the outer peripheral portions, and can reduce the stress concentration to the boundary area.

In another preferred embodiment of the invention, it is preferable that the thickness of the outer peripheral portion of said lattice walls is 0–400% larger than that of said inner peripheral portion. As a means for strengthening of said outer peripheral portion, this embodiment may be used along with said densification. On the other hand, when the thickness of the outer peripheral portion is thinner than that of said inner peripheral portion (said figure is less than 0%), there is a possibility that the effect of an improvement of mechanical strength, due to increased density, may decrease thereby. In addition, when the thickness of the outer peripheral portion is in excess of five times that of said inner peripheral portion (said figure is more than 400%), there is a possibility that a pressure drop may increase as a fluid passes through.

Further, it is also preferable that the boundary area between the inner and the outer peripheral portions in said lattice walls gradually decreases, in thickness, from outside to inside. This constitution can restrain rapid changes of the shape in the boundary area between the inner and the outer peripheral portions, and can reduce the stress concentration in the boundary area.

Furthermore, the difference in thermal expansion coefficient between the inner and the outer peripheral portions in said lattice walls is preferably within $\pm 0.5 \times 10^{-6}/°$ C. When said difference is not in this range, there is a problem that said structural body may be prone to thermal shock fracture, due to heat history, with large changes in temperature.

Furthermore, another embodiment of the invention provides a method of preparing the ceramic honeycomb structural body, comprising: lattice walls formed by a large number of cells which are channels for fluid and a peripheral wall which covers the circumference of said lattice walls, the outer peripheral portion of said lattice walls at least located in the vicinity of said peripheral wall containing the denser portion of smaller porosity than that of the inner peripheral portion of said lattice walls which are located inside said outer peripheral portion, characterized in that a melting-point lowering component, which lowers a melting point of a material constituting said ceramic honeycomb structural body, is applied on at least the outer peripheral portion of said lattice walls of said body, and then the resulting body is heat-treated to form said denser portion.

It should be noted that, in this method, said melting-point lowering component is applied to the desired portion, and the resulting body is heat-treated to change the partition wall itself into said denser portion.

Said melting point lowering component may be properly chosen according to the materials constituting said structural body. For example, when said body comprises a cordierite, a component which can lower the melting point of the cordierite by increasing the content is suitable. Talc, alumina, kaolin or a mixture thereof, which on constituents of cordierite, may be suitably used as said melting point lowering component. Also, a contaminant constituent of said cordierite, such as iron or titanium, may be used as said component. The increase in said contaminant content lowers the melting point of the cordierite.

Further, in order to apply said melting-point lowering component to said outer peripheral portion of said lattice walls, for example, a mixed solution of said melting point lowering component and a solvent may be applied on the desired portion. Said solvent includes various solvents such as an aqueous solvent (water, etc.) or a non-aqueous organic solvent.

Also, various methods, such as dipping, spraying, may be adopted to apply said mixed solution to said structural body. Said body to be applied with said melting point lowering component may be a body which has been dried after extrusion, or as fired after drying.

In the method of the invention, after said melting-point lowering component is applied to the outer peripheral portion of said lattice walls of said body, the resulting body is heat-treated. Thus, the portion where said melting-point lowering component is applied decreases in its porosity and forms a denser portion. Therefore, said outer peripheral portion of said lattice walls becomes a reinforced portion which has a higher mechanical strength than said inner peripheral portion.

Such mechanisms may be as follows:

When said firing is performed, the melting point of a portion which is contacts said melting point lowering component decreases, and the portion is partially fused according to the firing temperature. Thereby, such a fused portion penetrates the insides of the pores and fills said pores. Thus, a portion where said melting-point lowering component is applied on decreases in porosity, forms a dense portion and increases in a mechanical strength. Therefore, according to the invention, said structural body having said denser portion can be easily prepared.

Subsequently, in an embodiment of the invention, the content of alkali metals and alkaline earth metals, such as K, Na and Ca, in said melting-point lowering component is preferably less than 0.5%. This constitution can restrain a increase in a thermal expansion coefficient of said lattice walls. When said content of alkali metals and alkaline earth metals is more than 0.5%, there is a problem that the resulting denser portion may suffer an increase in the thermal expansion coefficient to be prone to thermal shock fracture.

Also, in another embodiment of the invention, said melting-point lowering component is preferably applied on the outer peripheral portion of said lattice walls in a manner which the applying amount gradually increases from inside to outside. In this case, said lattice walls can have a changing density, that is the outer portion is denser than the inner portion. Thereby, the stress concentration can be restrained and a remarkably improved durability can be obtained.

Further, the invention provides a ceramic honeycomb structural catalyst, wherein a catalyst component is supported by said ceramic honeycomb structural body.

Also, the invention provides a method of preparing a ceramic honeycomb structural catalyst, wherein a catalyst component is supported by said ceramic honeycomb structural body.

As the ceramic honeycomb structural catalyst according to the invention has said superior structural body, it makes it possible to activate the catalyst early and it has excellent durability.

EXAMPLES

Figure 2:
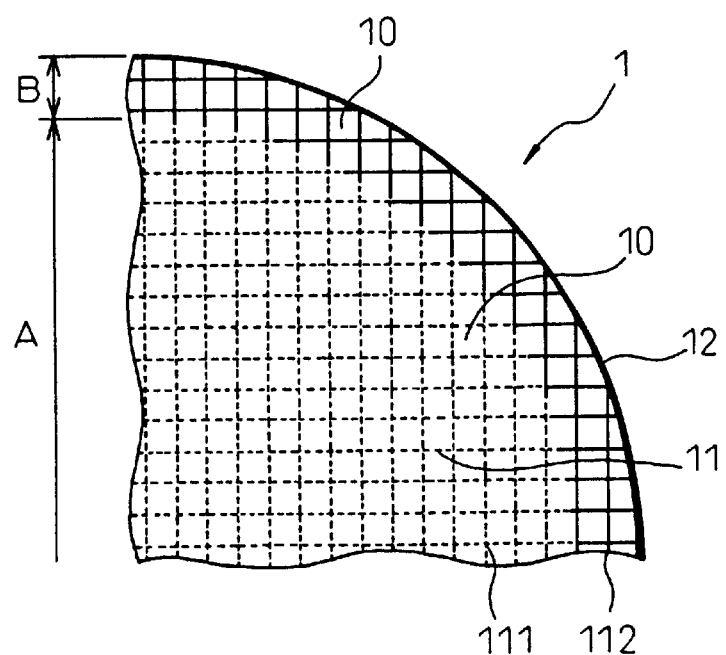
FIG. 2 is a enlarged view of details of the place M taken from FIG. 1.

Referring to FIGS. 1 and 2, there is shown a preferred embodiment of a ceramic honeycomb structural body and methods of preparing the same according to the invention.

These examples show a ceramic honeycomb structural body to be used for a catalyst support for purifying exhaust gasses, the ceramic material being a cordierite.

The ceramic honeycomb structural body, as shown in FIGS. 1 and 2, consists of lattice walls 11 formed by a large number of cells 10, which are channels for a fluid, and a peripheral wall 12 which covers the circumference of said lattice walls 11. As shown in FIG. 2, a peripheral wall 12 as well as an outer peripheral portion 112 of said lattice walls 11 located in the vicinity of said peripheral wall 12 (area B) contain a densified portion of a smaller porosity than that of an inner peripheral portion 111 of said lattice walls 11 which is located inside said outer peripheral portion 112 (area A).

A cordierite which constitutes said structural body has a theoretical composition of $2MgO.2Al_2O_3.5SiO_2$. The composition usually includes 49.0–53.0 wt % of $SiO_2$, 33.0–37.0 wt % of $Al_2O_3$ and 11.5–15.5 wt % of MgO. When a cordierite honeycomb structural body is molded, talc ($Mg_3Si_4O_{10}(OH)_2$), kaolin ($Al_2Si_2O_5(OH)_4$), alumina ($Al_2O_3$) and so on are usually used as raw materials for a cordierite. Various compounds other than these compounds may be properly used as sources of Si, Al or Mg. For example, said compounds include oxide, nitride, carbide, boride, hydroxide and chloride, etc. which contain at least one of the elements Si, Al and Mg.

In these examples, talc, kaolin, alumina and aluminium hydroxide powder were used as raw materials for preparing a cordierite and mixed together at a rate such that the composition after firing was in the neighborhood of the theoretical one. To 100 wt % of said raw materials, 2.8 wt % of a lubricant and a wetting agent, 5.5 wt % of a binder and an adequate amount of water were added and kneaded to obtain a body. The lubricant and the wetting agent were a 5% solution of polyalkylene glycol and the binder was methyl cellulose (water-soluble). Subsequently, said body was molded by extrusion to form a honeycomb shape and then dried. The molded body was cylindrical in shape. The sizes were 100 mm in outer diameter of the peripheral wall 12, 100 mm in length, 0.3 mm in the thickness of the peripheral wall 12 and 60 μm in the thickness of the lattice walls 11.

Then, a melting-point lowering component, which lowers a melting point of a material constituting said ceramic honeycomb structural body, is applied on said peripheral wall and said outer peripheral portion of said lattice walls of said structural body, and then the resulting body is heat-treated. In this example, talc, which is a source of Si and Mg, is used as a melting-point lowering component. Application to said structural body was carried out using a solution in which said talc is dispersed in a non-aqueous solution.

Specifically, said structural body was dipped in said solution, the longitudinal direction of the cells being kept horizontal. Said dipped structural body was rotated. Thereby, said solution was applied on the whole B area in FIG. 1, that is said peripheral wall and said outer peripheral portion of said lattice walls.

Then, any extra solution obstructing the fluid channels was eliminated by an air blower and the body was dried and then heat-treated. The heat-treatment was carried out at a temperature which was not less than the melting point of said applied portion and less than that of the cordierite composition. Firing was performed at 1430° C. for 4 hours in the atmospheric. Thus, the area B, comprising a peripheral wall 12 as well as an outer peripheral portion 112 of said lattice walls 11, had a denser portion of a smaller porosity than that of the area A comprising an inner peripheral portion 111.

Subsequently, the properties of the resultant honeycomb structural body 1 were measured for said area A and area B as well as for the entire body. A comparative body was prepared by the same method as these examples, except for the application of said melting-point lowering component, and its properties were also determined.

The obtained results are shown in Table 1. The porosity in Table 1 was determined by using a porosimeter. The thermal expansion coefficient was determined by measuring in the range from room temperature to 800° C. through the use of a thermal expansion coefficient measuring device. The A-axis compression strength was determined by using an autographic recorder. Further, the isostatic strength was determined by an isostatic strength measuring device.

TABLE 1

| Properties | Example (with densification) | | | Comparative body (without densification) | | |
|---|---|---|---|---|---|---|
| | A area | B area | Entire | A area | B area | Entire |
| Porosity (%) | 35 | 30 | — | 35 | 35 | 35 |
| Thermal expansion coefficient ($\times 10^{-6}$/° C.) | 0.5 | 0.5 | 0.5 | 0.5 | 0.5 | 0.5 |
| A-axis compression strength (Mpa) | 5 | 12 | — | 5 | 6 | — |
| Isostatic strength (Mpa) | — | — | 2.5 | — | — | 1.7 |

It should be understood that there is no difference in the thermal expansion coefficient between the area A and the area B, but the area B is denser and has a porosity which is 5% less than that of the area A. Therefore, the A-axis compression strength of the area B is about twice that of the area A, and the isostatic strength showing the entire strength is 50% more than that of the comparative body.

Thus, in these examples, the peripheral wall 12 and the outer peripheral portion 112 are made denser to have a smaller porosity. Therefore, the area B, comprising the peripheral wall 12 as well as the outer peripheral portion 112, becomes a reinforced portion which has higher mechanical strength than said inner peripheral portion of larger porosity. Thus, as mentioned above, even if the thickness of said lattice walls 11 is reduced to 60 μm, the mechanical strength required of said entire body is maintained due to the presence of said reinforced portion in said peripheral wall 12 and said outer peripheral portion 11.

Further, the mechanical strength of said peripheral wall and said outer peripheral portion is improved by forming the denser portion, and reinforcing materials do not fill the pores. Thus, the pores open to the surface of said outer peripheral portion can be maintained, and a uneven surface and a large surface area can be secured. Thereby, the amount of the supported catalyst or carrier can be sufficiently secured. Thus, the catalytic effects can be significantly improved owing to the satisfactory support and the early activation.

In these examples, talc was used as a melting-point lowering component. However, the degree of density may be properly changed by selecting parameters such as types or particle sizes of raw materials, solvents, concentration of solutions, and firing temperature, etc. Specifically, as is apparent from a phase diagram (not shown), various compounds other than talc may be used as a melting-point lowering component to have a same effect as the talc as follows:

The compounds may, for example, include Si.Mg source such as serpentinite ($Mg_3Si_2O_5(OH)_4$), chlorite and forsterite ($Mg_2SiO_4$), Si source such as kaolin, pyrophyllite ($Al_2Si_4O_{10}(OH)_2$), silica stone ($SiO_2$) and silicon dioxide, as well as Mg source such as brucite ($Mg(OH)_2$), magnesium hydroxide and magnesium oxide.

Further, when the ceramic is a cordierite, of which the thermal expansion coefficient results from its crystalline orientation, as in said examples, it is more desirable to use anisotropic particles, such as lamellar, needle-like or columnar particles of talc, kaolin and so on, than isotropic particles, to maintain a lower thermal expansion coefficient.

Also, said melting-point lowering component may be applied by various methods other than the above-mentioned method. For example, at the end of said structural body, after the area corresponding to the inner peripheral portion 111 of said lattice walls is covered with a blind patch, a solution containing said lowering component may be sprayed longitudinally along the channels. Furthermore, the solution may be also sprayed along a ringed guide or diffuser just corresponding to said area B.

Also, although the examples describe a cordierite honeycomb structural body to be used for a catalyst support for purifying exhaust gases of an internal combustion engine, the ceramic honeycomb structural body according to the invention can be used for other application, such as a filter for purifying water, etc.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A ceramic honeycomb structural body, comprising:
   lattice walls formed by a large number of cells which are channels for fluid; and
   a peripheral wall which covers an outer circumference of said lattice walls, an outer peripheral portion of said lattice wails at least located in the vicinity of said peripheral wall containing a denser portion of a smaller porosity than that of an inner peripheral portion of said lattice walls which is located from a center of the ceramic honeycomb structural body to an inside of said outer peripheral portion, wherein the difference in thermal expansion coefficient between the inner and the outer peripheral portions in said lattice walls is within $\pm 0.5 \times 10^{-6}/°$ C.

2. The ceramic honeycomb structural body, as claimed in claim 1, wherein APr demonstrated by the following equation is not less than 5%:

$$\Delta Pr = -(Pout-Pin)/Pin$$

in which Pout is a porosity of said denser portion of said outer peripheral portion of said lattice walls, and Pin is a porosity of said inner peripheral portion of said lattice walls.

3. The ceramic honeycomb structural body, as claimed in claim 1, wherein a thickness of the outer peripheral portion of said lattice wails is not less than 1.20% of a distance between the center of said body and the inner side of said peripheral wall.

4. The ceramic honeycomb structural body, as claimed in claim 1, wherein the porosity of said denser portion of said outer peripheral portion of said lattice walls decreases from an inside thereof to an outside thereof.

5. The ceramic honeycomb structural body, as claimed in claim 1, wherein the thickness of said outer peripheral portion of said lattice walls is 0–400% larger than the thickness of said inner peripheral portion in said lattice walls.

6. The ceramic honeycomb structural body, as claimed in claim 1, wherein the lattice walls at a boundary area between the inner and the outer peripheral portions gradually decrease in thickness from the outside to the inside.

7. The ceramic honeycomb structural body as claimed in claim 1, wherein said outer peripheral portion contains a melting-point lowering component.

8. The ceramic honeycomb structural body as claimed in claim 7, wherein said melting-point lowering component is talc.

9. A ceramic honeycomb structural catalyst, wherein a catalyst component is supported on a ceramic honeycomb structural body, comprising:
   lattice walls formed by a large number of cells which are channels for fluid; and
   a peripheral wall which covers an outer circumference of said lattice walls, an outer peripheral portion of said lattice walls at least located in the vicinity of said peripheral wall containing a denser portion of a smaller porosity than that of an inner peripheral portion of said lattice walls which is located from a center of the ceramic honeycomb structural body to an inside of said outer peripheral portion, wherein the difference in thermal expansion coefficient between the inner and the outer peripheral portions in said lattice walls is within $\pm 0.5 \times 10^{-6}/°$ C.

* * * * *